(12) United States Patent
Allen et al.

(10) Patent No.: US 7,056,356 B2
(45) Date of Patent: Jun. 6, 2006

(54) PROCESS FOR PRODUCING CRYSTALS

(75) Inventors: Peter Mark Allen, Neustadt (DE);
Christoph Gahn, Speyer (DE);
Christopher William Rieker,
Mutterstadt (DE); Heinz-Walter Schneider, Ludwigshafen (DE); Robert Wagner, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 412 days.

(21) Appl. No.: 10/296,442

(22) PCT Filed: May 21, 2001

(86) PCT No.: PCT/EP01/05815

§ 371 (c)(1),
(2), (4) Date: Nov. 25, 2002

(87) PCT Pub. No.: WO01/91874

PCT Pub. Date: Dec. 6, 2001

(65) Prior Publication Data

US 2003/0180202 A1 Sep. 25, 2003

(30) Foreign Application Priority Data

May 29, 2000 (DE) .......................... 100 26 619

(51) Int. Cl.
*B01D 9/00* (2006.01)

(52) U.S. Cl. ................... 23/295 R; 23/302 A
(58) Field of Classification Search .......... 23/295 R, 23/296, 300, 301, 302 R, 302 A, 303
See application file for complete search history.

(56) References Cited

U.S. PATENT DOCUMENTS 3,873,275 A 3/1975 Bennett ............... 23/273

FOREIGN PATENT DOCUMENTS

| DE | 199 12 699 | 9/2000 |
|---|---|---|
| JP | 63209702 | 8/1988 |
| WO | WO 93/19826 | 10/1993 |

OTHER PUBLICATIONS

Mersmann et al. "Dimensionierung von Kristallisatoren" Chem. Ing. Tech. vol. 50 (1978) pp. 65–76.

*Primary Examiner*—Edward M. Johnson
(74) *Attorney, Agent, or Firm*—Novak Druce & Quigg

(57) ABSTRACT

An apparatus and a process for crystallizing substances from solutions or dispersions containing these substances, in a crystallizer containing a classifying zone (3), comprise a) an inner and an outer circulation system (1; 2), the inner circulation system (1) being present in the crystallizer, the inlet of the outer circulation system (2) being connected to the inner circulation system (1) via the classifying zone (3), the outer circulation system, being present outside the crystallizer, the outlet of the outer circulation system (2) being connected to the inner circulation system (1) of the crystallizer, and a means for dissolving crystals being arranged in the outer circulation system (2), before its outlet, b) an inflow (4) for solution and/or dispersion, which inflow is present on the crystallizer or on the outer circulation system, and c) an outflow (5) for dispersions, which outflow is arranged on the crystallizer or on the outer circulation system.

Figures 1A, 1B:
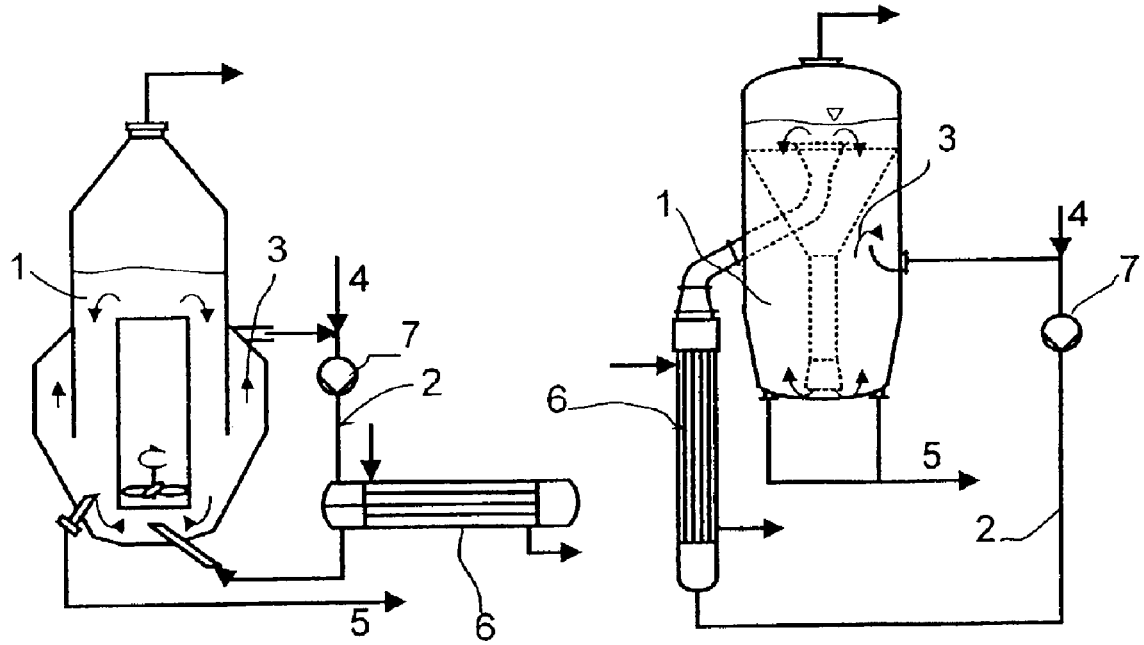

The novel apparatus has the special feature that a line (8) connecting the outer and inner circulation systems (1; 2) to one another and intended for transporting (recycling) dispersion and/or a line (8) for transporting (recycling) dispersion are additionally present, in which both its entrance and its exit are connected to the inner circulation system (1).

8 Claims, 4 Drawing Sheets

PROCESS FOR PRODUCING CRYSTALS

The present invention relates to an apparatus and a process for crystallizing substances and to a crystal fraction thus prepared.

The crystallization of substances from solutions is a thermal separation process. A solution of a molecular dispersion of one or more solids in a solvent is preconcentrated by generally multistage evaporation of solvent. The preconcentrated solution must then be supersaturated so that crystals can form and grow. When this supersaturation is eliminated, the excess solid is precipitated as sediment which can be separated mechanically from the residual solution. Thus, the dissolved substance is separated from the original solution. If a specific particle size distribution of the crystals is desired, the degree of saturation, nucleation and crystal growth must then be controlled, in the classifying crystallizer which then has to be designed appropriately, by adapting the operating parameters, such as cooling and evaporation rate, flow, etc.

The driving force in the crystallization is the difference between the concentration of the dissolved substance in the supersaturated solution and that in the just saturated solution, i.e. the disturbance of the solution equilibrium. The preconcentrated solution must therefore first be saturated and then supersaturated beyond the saturation point. The supersaturation is achieved in practice in three ways:

In the case of high temperature dependence of the solubility, the supersaturation is achieved by simply cooling the saturated solution by surface cooling (cooling crystallization);

if there is only a slight temperature dependence of the solubility, the solution is supersaturated by evaporating solvent (evaporative crystallization);

if the solubility depends to a marked extent on the temperature or if the solution has to be treated in a gentle manner thermally, solution cooling and solvent evaporation are combined (vacuum crystallization).

As a rule, the elimination of supersaturation takes place in two simultaneous steps: In the first step, crystal nuclei are formed; in the second step, those crystal nuclei which are larger than a critical minimum size grow into very coarse product crystals by taking up solid from the supersaturated solution. The nucleation rate increases with increasing supersaturation; as a rule, spontaneous formation of many small nuclei is observable after a specific supersaturation has been exceeded. This effect is evident in the formation of fine crystal showers. For the necessary control of the nucleation in the crystallizer, the aim is to remove in particular fine fractions separately and accordingly to redissolve fine crystals. The removal of crystals by classification and the dissolution of the fine particles is described in A. Mersmann, W. F. Beer and D. Seifert, Chem. Ing. Tech. 50 (1978) 2, 65–76, Verlag Chemie, Weinheim. With persisting supersaturation, the seed crystals initially taken in the solution and/or the nuclei formed grow into larger crystals. The corresponding solution becomes supersaturated again. The supersaturation of the solution is followed by the elimination of supersaturation as the actual crystallization until a specific degree of saturation is reached again, at which the formation of fine crystal showers is triggered.

The object of a crystallization process is as a rule to prepare a crystalline, saleable product of uniform quality, the product acquiring this quality in particular through the crystal size distribution. The crystal size distribution influences the separability of the residual solution, the shelf-life of the crystals, the dust fraction, the dissolution behavior, the sprinkability or flowability, etc. The uniform quality of the product is adversely affected by the fluctuation of the particle size distribution of the crystals as a function of time—this fluctuation is due to the periodic fine crystal showers. These fine crystal showers finally result in product of nonuniform quality having a large finely crystalline fraction. The finely crystalline fractions cause considerable problems during working-up—finely crystalline fractions are, for example, difficult to separate off by centrifuging. The above problems also occur in crystallizers which comprise fine particle dissolution—a periodic fluctuation of the particle size distribution is also observed in such crystallizers.

It is an object of the present invention to provide an apparatus by means of which crystals which have small fluctuations in the particle size distribution as a function of time can be produced continuously. In particular, a reduction of the intensity of the fine salt showers is to be achieved. The apparatus should ensure that a crystallization process is carried out effectively and economically.

We have found that this object is achieved by an apparatus for crystallizing substances from solutions or dispersions containing these substances, in a crystallizer containing a classifying zone, comprising a) an inner and an outer circulation system, the inner circulation system being present in the crystallizer, the inlet of the outer circulation system being connected to the inner circulation system via the classifying zone, the outer circulation system being present outside the crystallizer, the outlet of the outer circulation system being connected to the inner circulation system of the crystallizer, and a means for dissolving crystals being arranged in the outer circulation system, before its outlet, b) an inflow for solution and/or dispersion, which inflow is present on the crystallizer or on the outer circulation system, and c) an outflow for dispersions, which outflow is arranged on the crystallizer or on the outer circulation system.

In the novel apparatus, a line connecting the outer and inner circulation systems to one another and intended for transporting (recycling) dispersion and/or a line for transporting (recycling) dispersion are additionally present, in which both its entrance and its exit are connected to the inner circulation system.

Substances are to be understood as meaning chemical compounds and elements which can be crystallized. In general, only one substance is present in each of the solutions or dispersions containing these substances—thus, only crystals of a single substance are produced. Dispersions are to be understood as meaning in particular liquids which contain (finely distributed) crystals. Frequently, the dispersion is present in the form of a suspension. The inner circulation system means the flow system which flows through the crystallizer and may consist of a plurality of part-streams. The inner circulation system is decisively determined by the dimensions—shape of the crystallizer—and by the means causing a movement, such as pumps or propellers. The outer circulation system present outside the crystallizer preferably contains corresponding connecting lines, preferably pipes, a means for dissolving crystals being installed in the connecting lines. The classifying zone is preferably arranged in the crystallizer in such a way that, during operation of the crystallizer, small crystals are preferably introduced into the classifying zone. The lines of the apparatus are generally in the form of pipes. Suitable means for dissolving crystals are all means by which the crystals of the dispersions can be dissolved. As a rule, the means for dissolving crystals causes a temperature change in the dispersion. Means for dissolving crystals are to be understood as meaning only those means which dissolve at least 5, preferably at least 60, % by weight of the solid present in the dispersion in the form of crystals, starting from the dispersion stream introduced into the means.

The novel apparatus permits a crystallization which is distinguished by a narrow particle size distribution of the crystals produced. The absence of fine crystal showers is at least substantially ensured during operation. The dispersions obtained can be more easily worked up—the centrifuging of the crystals is easier and the crystal fractions obtained during the working-up are of uniform quality.

In general, the crystallizer is in the form of a DTB (draft-tube-baffled) crystallizer or in the form of a fluidized-bed crystallizer, preferably in the form of an Oslo crystallizer.

In a preferred embodiment, the novel apparatus has the special feature that a line connecting the outer and inner circulation systems to one another and intended for transporting (recycling) dispersion and/or a line for transporting (recycling) dispersion are additionally present, in which both its entrance and its exit are connected to the inner circulation system, neither of the lines having any means for dissolving crystals.

In general, the means for dissolving crystals is present in the form of a heat exchanger or, if required, in the form of a reactor for carrying out exothermic reactions. The crystals are accordingly dissolved by heating the dispersion. Preferably, the lines are equipped with pumps for transporting dispersion and solution. As a rule, the outer circulation system also has pumps for transporting the dispersion or the solution.

In a preferred embodiment of the invention, the classifying zone is present in the form of a sedimentation zone. There, the crystals are classified on the basis of their different sedimentation behavior, so that smaller crystals preferentially pass from the crystallizer into the outer circulation system.

The present invention also relates to a process for crystallizing substances from solutions or dispersions containing these substances, in an apparatus having an inner and an outer circulation system, i) the inner circulation system being present in a crystallizer containing a classifying zone and said crystallizer containing a dispersion which comprises crystals of the substances and is moved through the inner circulation system, ii) a part-stream of the dispersion being transported from the crystallizer via the classifying zone into the outer circulation system, iii) crystals contained in this dispersion being dissolved in the outer circulation system by a means for dissolving crystals, iv) the dispersion or the solution formed by complete dissolution of crystals from the dispersion being subsequently recycled to the inner circulation system of the crystallizer, v) a solution and/or dispersion containing the substances being fed to the crystallizer and/or to the outer circulation system and vi) a dispersion comprising crystals of the substances being removed from the outer circulation system and/or from the crystallizer.

In the novel process, a part-stream of the dispersion comprising crystals is removed from the inner circulation system and is fed to the outer circulation system and/or a part-stream of the dispersion comprising crystals is removed from the inner circulation system and is recycled to the inner circulation system.

The novel process ensures that the volume flow over the fine particle resolution and the classifying effect of this circulation are established independently of one another.

The fluctuations of the particle size distribution as a function of time (the oscillation or fluctuation of the particle size distribution), in particular due to the fine particle showers, are significantly reduced by the novel process.

In a preferred embodiment, the novel process has the particular feature that a part-stream of the dispersion comprising crystals is removed from the inner circulation system and is fed to the outer circulation system and/or a part-stream of the dispersion comprising crystals is removed from the inner circulation system and is recycled to the inner circulation system, without the crystals of the dispersion being dissolved to a substantial extent in each case.

Being dissolved to a substantial extent is to be understood as meaning that at least 10, preferably 30, % by weight of the solid present in the form of crystals in the dispersion is dissolved.

The classification of the crystals is preferably effected on the basis of the different sedimentation behavior of the crystals.

Crystals contained in the dispersion are as a rule dissolved by heating the dispersion. In a preferred embodiment of the invention, the substances to be crystallized are ammonium sulfate or adipic acid. Water is preferably used as a liquid component of the dispersion or as a solvent for the crystals. The solubility of the substances in the corresponding liquid generally increases with the temperature of the solution or dispersion.

In general, the dispersion removed from the outer circulation system and/or from the crystallizer and comprising crystals of the substances is worked up and the crystals of the substances are thus obtained in pure form. The resulting crystal fractions generally have a small fine particle fraction and possess a narrow particle size distribution. These properties favor a uniform quality of the crystal fractions.

The present invention also relates to a crystal fraction which can be prepared as explained above.

Figure 2A:
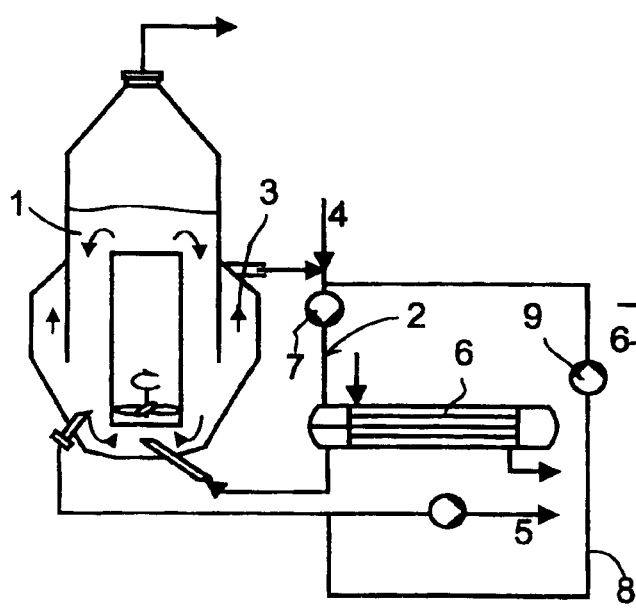
Figure 2B:
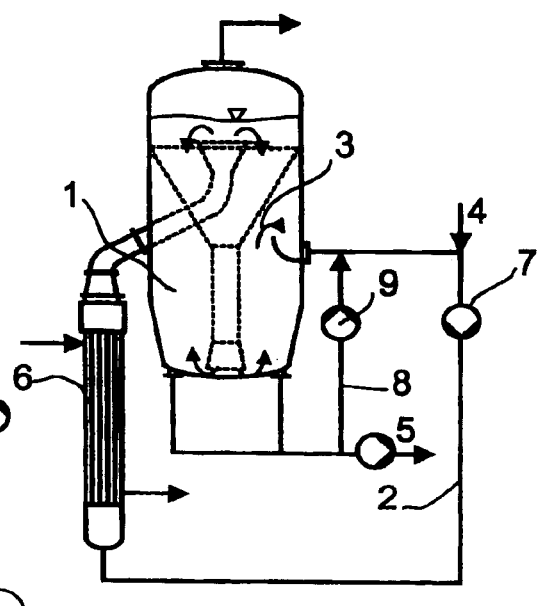
Figure 3A:
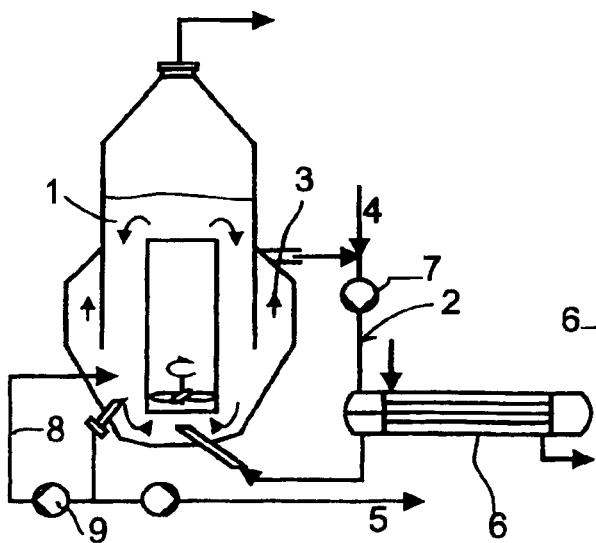
Figure 3B:
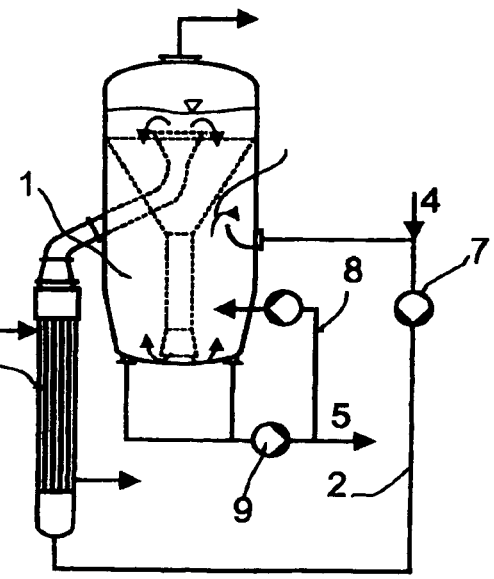
Figure 4:
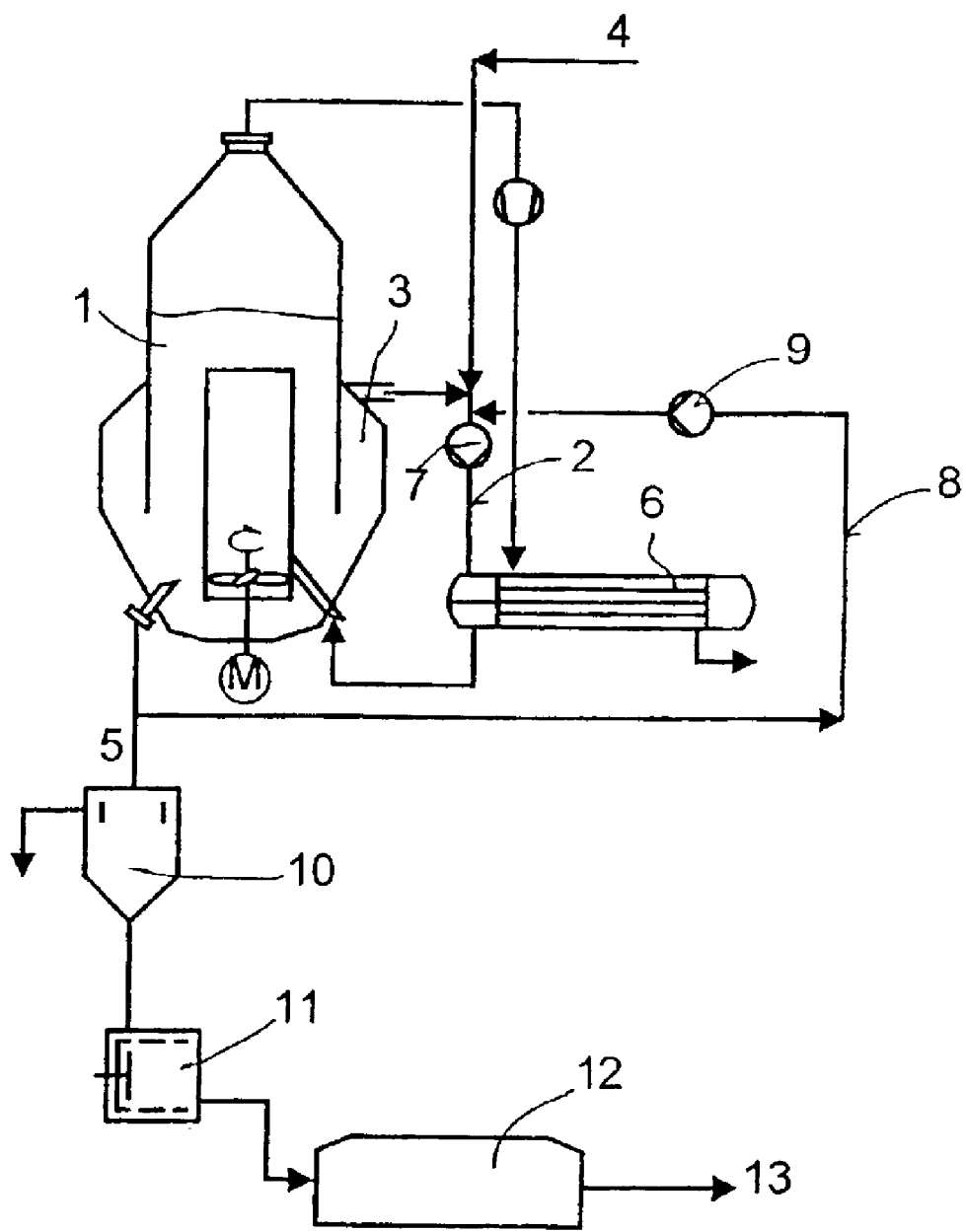
Figure 5:
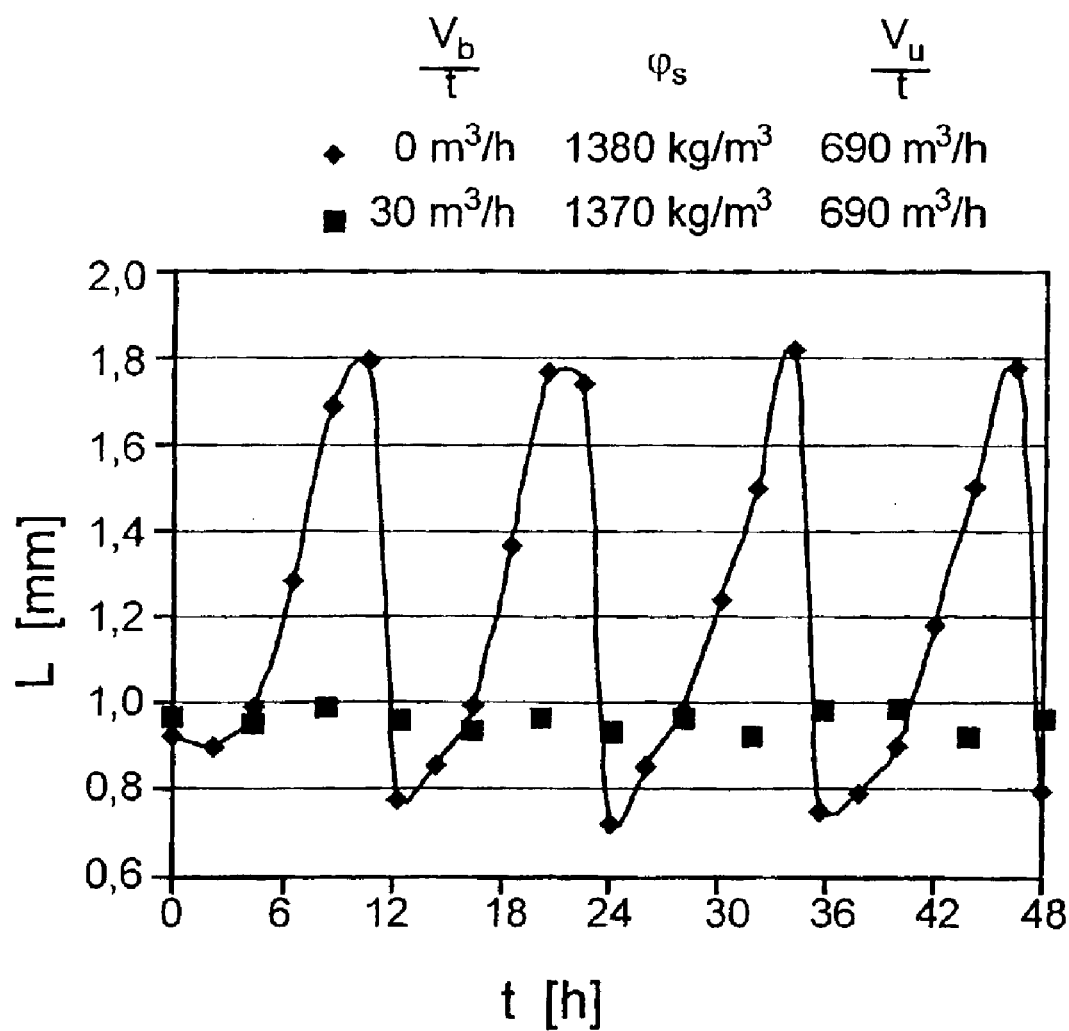

In the attached drawing:

FIG. 1 shows diagrams of apparatuses for crystallizing substances according to the prior art-FIG. 1*a* shows a diagram of a corresponding DTB crystallizer; FIG. 1*b* shows a diagram of a corresponding Oslo crystallizer, FIG. 2 and FIG. 3 show diagrams of novel apparatuses for crystallization (FIG. 2*a* and FIG. 3*a* show corresponding DTB crystallizers; FIG. 2*b* and FIG. 3*b* show corresponding Oslo crystallizers), FIG. 4 shows a diagram of a novel apparatus for crystallization, including the arrangement of means for working up the dispersion, and FIG. 5 shows a graph in which the mean particle size L is plotted as a function of the time t; various volume flows for transport (recycling) $V_b/t$ and for the outer circulation system $V_u/t$ are taken as a basis.

The apparatuses for crystallization which are shown schematically in FIGS. 1 to 3 all have an inner circulation system 1, an outer circulation system 2, a classifying zone 3, an inflow 4, an outflow 5, a heat exchanger 6 arranged in the outer circulation system and a pump 7 intended for transporting the dispersion and arranged in the outer circulation system. In contrast to the prior art apparatuses according to FIG. 1, the novel apparatuses according to FIG. 2 and FIG.

3, however, also have lines 8 for transporting (recycling) the dispersion. In each case, pumps 9 for transporting dispersion are arranged on these lines 8.

The dispersion can be removed at any desired point of the crystallizer, but preferably in the region of the bottom. The dispersion obtained in the classifying zone 3 can be fed via any desired number of connecting pieces into the outer circulation system 2. As a rule, from one to three connecting pieces are provided for this purpose.

In addition to the apparatus for crystallization, FIG. 4 also shows schematically an arrangement for working up the dispersion. The dispersion is passed from the apparatus for crystallization into a thickener 10. In this, the crystals settle out and the supernatant liquid is removed. The crystals collecting at the bottom of the thickener are transferred to a centrifuge 11 and freed therein from further liquid. Finally, the crystals removed from the centrifuge are dried in a dryer 12. The crystal fractions 13 are discharged from the dryer 12 to a downstream finishing procedure.

As explained above, FIG. 2 and FIG. 3 show novel possibilities for transporting (recycling) the dispersion. As an alternative to the arrangement in FIG. 2, in which the line 8 for the transport (recycling) enters the outer circulation system 2 before the pump 7, the line 8 for the transport (recycling) can also enter the outer circulation system 2 between the pump 7 and the heat exchanger 6 and alternatively furthermore behind the heat exchanger 6. Regarding the arrangement shown schematically in FIG. 3, it should be noted that the transport (recycling) of the dispersion can be effected on the one hand via the line 8 and via a pump 9, but the transport (recycling) can also be effected via a pump and an additional communition element, such as a mill.

The invention is to be additionally explained below with reference to an example.

EXAMPLE

First, a comparative experiment according to the prior art was carried out (system: ammonium sulfate/water), a plant shown schematically in FIG. 1a being used. Crystals having a periodically fluctuating particle size distribution were obtained as the product of the corresponding process—the particle size distribution exhibits oscillating behavior as a function of time (cf. corresponding curve in FIG. 5). Excessively efficient fine particle dissolution in the heat exchanger could be regarded as a major reason for the oscillating behavior. The oscillating behavior could then be explained as follows:

- It is assumed that the fine particle fraction in the crystallizer is high at a time t. These fine particles are pumped via the classifying zone of the crystallizer into the heat exchanger (in the case of efficient fine particle dissolution, they are completely dissolved there);
- this results in a reduction in the fine particle fraction in the crystallizer and hence a reduction in the crystal surface area (this means the sum of the surface areas of all crystals contained in the suspension) on which the supersaturation is eliminated by crystal growth. A reduction in the crystal surface area therefore results in an increase in the degree of supersaturation;
- the degree of supersaturation increases to a critical value at which small abraded fragments (smaller than 50 μm) are activated to grow;
- as a result of the growth of these fragments, the crystal surface area in the crystallizer increases rapidly again and the degree of supersaturation is accordingly rapidly eliminated. The large number of growing (small) crystals manifests itself as a fine crystal shower;

these fine particles are now dissolved again in the heat exchanger in the course of time, and the cycle begins again.

To prevent the fluctuation of the particle size distribution as a function of time, according to the invention an experiment was carried out in a plant shown schematically in FIG. 2a (system: ammonium sulfate/water). Dispersion was transported from the inner circulation system 1 via a line 8 for the transport (recycling) into the outer circulation system 2 before the pump 7. Consequently, additional crystals, in particular crystals having a large particle size, were transported into the outer circulation system and into the heat exchanger 6. The dissolution capacity of the heat exchanger was overstretched by feeding in these crystals, with the result that efficient dissolution of fine particles in the heat exchanger 8 was prevented. The following operating conditions were present:

| | |
|---|---|
| Volume flow rate $V_0/t$ over the outer circulation system 2 | 690 m³/h |
| Feed (into the apparatus) | 50 m³/h |
| Production rate (crystals which have been worked up using the plant according to FIG. 4; sedimentation, centrifuging, drying) | 9 t/h. |

FIG. 5 shows the result of the experiment. It is found that, at a high volume flow rate $V_b/t$ of the transport (recycling), the fluctuation of the particle size distribution as a function of time can be very substantially prevented. In contrast, dispensing with transport (recycling)—comparative experiment ($V_b/t=0$)—leads to considerable fluctuation of the mean particle size L over time. The novel transport (recycling) of dispersion thus ensures a uniform quality of the product and suppression of the fine particle shower, which leads to easier working-up. Moreover, it was possible to increase the content of ammonium sulfate in the feed to such an extent that a production rate of 11 t/h was achieved without resulting in a marked deterioration in the product quality. With the same increase in the ammonium sulfate content in the feed, the abovementioned process according to the prior art would result in a considerable increase in the intensity of the fine crystal showers, so that working-up would then be considerably more difficult (problems, inter alia, with centrifuging and drying). The novel process thus also permits an increase in the production rate.

We claim:

1. A process for crystallizing substances from solutions or dispersions containing these substances, in an apparatus having an inner and an outer circulation system, i) the inner circulation system being present in a crystallizer containing a classifying zone and said crystallizer containing a dispersion which comprises crystals of the substances and is moved through the inner circulation system, ii) a part-stream of the dispersion being transported from the crystallizer via the classifying zone into the outer circulation system, iii) crystals contained in this dispersion being partially dissolved in the outer circulation system by a heat exchanger, iv) the dispersion or the solution formed by complete dissolution of crystals from the dispersion being subsequently recycled to the inner circulation system of the crystallizer, v) a solution and/or dispersion containing the substances being fed to the crystallizer and/or the outer circulation system and vi) a dispersion comprising crystals of the substances being removed from the outer circulation system and/or from the crystallizer, vii) wherein a part-stream of the dispersion comprising crystals is removed from the inner circulation system and this part-stream is fed via a line for recycling the dispersion to the outer circulation system where the line enters the outer circulation system before the heat exchanger to overstretch the dissolution capacity of the heat exchanger by feeding in this part-stream without the crystals of the dispersion being dissolved to a substantial extent.

2. A process as claimed in claim 1, wherein the crystallizer used is in the form of a DTB crystallizer or in the form of a fluidized-bed crystallizer.

3. A process as claimed in claim 2, wherein the crystallizer is an Oslo crystallizer.

4. A process as claimed in claim 1, wherein crystals contained in the dispersion are dissolved by heating the dispersion.

5. A process as claimed in claim 1, wherein the substances to be crystalized are ammonium sulfate or adipic acid.

6. A process as claimed in claim 1, wherein the dispersion removed from the outer circulation system and/or from the crystallizer and comprising crystals of the substances worked up and the crystals of the substances are thus obtained in pure form.

7. A process as claimed in claim 1, wherein the line for recycling the dispersion enters the outer circulation system before the heat exchanger and the pump intended for transporting the dispersion and arranged in the outer circulation system.

8. A process as claimed in claim 1, wherein at least 10% by weight of the crystals of the dispersion are not dissolved.

\* \* \* \* \*